(12) United States Patent
Kejha

(10) Patent No.: US 7,399,554 B2
(45) Date of Patent: Jul. 15, 2008

(54) HYBRID RECHARGEABLE BATTERY HAVING HIGH POWER AND HIGH ENERGY DENSITY LITHIUM CELLS

(76) Inventor: Joseph B. Kejha, 1830 Columbia Ave., Folcroft, PA (US) 19032-0005

( * ) Notice: Subject to any disclaimer, the term of this patent is extended or adjusted under 35 U.S.C. 154(b) by 237 days.

(21) Appl. No.: 11/081,350

(22) Filed: Mar. 17, 2005

(65) Prior Publication Data
US 2006/0208692 A1    Sep. 21, 2006

(51) Int. Cl.
*H01M 4/58* (2006.01)
*H01M 4/00* (2006.01)
*H01M 10/46* (2006.01)

(52) U.S. Cl. .............. 429/231.95; 429/218.1; 429/220; 429/329; 429/330; 429/337; 429/338; 320/103

(58) Field of Classification Search ............ 429/231.95, 429/218.1, 220, 329, 330, 337, 338
See application file for complete search history.

(56) References Cited

U.S. PATENT DOCUMENTS

| | | | | |
|---|---|---|---|---|
| 6,165,646 | A * | 12/2000 | Takada et al. | ............... 429/322 |
| 6,503,646 | B1 * | 1/2003 | Ghantous et al. | ............... 429/3 |
| 6,639,387 | B2 * | 10/2003 | Kitagawa et al. | ............ 320/134 |
| 2005/0105226 | A1 * | 5/2005 | Bedard et al. | ................. 361/62 |

* cited by examiner

*Primary Examiner*—Patrick Ryan
*Assistant Examiner*—Angela Martin
(74) *Attorney, Agent, or Firm*—Zachary T. Wobensmith, III

(57) ABSTRACT

A hybrid rechargeable lithium battery, which includes a plurality of high power rechargeable cells, having nano-particles therein, and high energy density rechargeable cells, with the high energy cells recharging the high power cells. The battery preferably includes a low volt parallel charger to simultaneously and individually charge both the high power and high energy cells, through a protective device. All cells are then discharged in series at high voltage, and are individually protected from over discharge. A rechargeable battery having both high power and high energy density cells is thus provided.

19 Claims, 4 Drawing Sheets

HYBRID RECHARGEABLE BATTERY HAVING HIGH POWER AND HIGH ENERGY DENSITY LITHIUM CELLS

CROSS REFERENCE TO RELATED DOCUMENTS

The subject matter of this invention is shown and described in the Disclosure Document of Joseph B. Kejha, Ser. No. 550,764 filed Apr. 8, 2004, and entitled "High Power and High Energy Density Lithium-Ion Rechargeable Hybrid Battery".

BACKGROUND OF THE INVENTION

1. Field of the Invention

This invention relates to a hybrid rechargeable battery which is of the type that includes both high power and high energy density lithium cells, with an exterior smart circuit interface, and an exterior charger.

2. Description of the Prior Art

It has been recognized that there is a need for a high power battery that can repeatedly deliver maximum electrical current for a longer time than currently available capacitors. Batteries that incorporate high power cells and deliver relatively high maximum electrical current for a longer time than a capacitor are available, but the duration of their operation is limited. High energy density cells store and deliver a greater amount of electrical energy, but at lower electrical current than high power cells.

U.S. Pat. No. 5,998,0522 of Yamin, discloses a hybrid battery comprising a primary cell and rechargeable (secondary) cell connected in parallel. The suggested rechargeable cell is a lithium-ion cell, and the primary cell is lithium-thionylchloride based or other oxyhalide based. This system has a disadvantage of not being a rechargeable unit with high cost of the primary cell therein, and the whole battery has to be disposed of after use. In this proposed design, both cells in the battery must be replaced with a new battery after full discharge of the primary cell, which is very expensive.

Another combination, which is known is a hybrid system having a capacitor and a primary battery is manufactured by Tadiran Batteries, Kiryat Ekron, Israel, and Port Washington, N.Y. Similar cost disadvantages occur, and additionally the capacitor provides only very short pulsing capability.

Another combination hybrid, known in military applications, is the use of a primary zinc-air battery with a lithium-ion battery connected thereto by a cable. Again the cost of the primary battery replacement is high. Several zinc-air cells are connected in series to match the voltage of the lithium-ion battery. Only the primary battery is disposed of after discharge, due to the disconnectable cable.

In cases of rechargeable cells, the lithium-ion cells described above are of standard design, and not designed for very high rates of discharge, as described in the present invention.

As an example, my prior art published application Ser. No. 09/911,036 entitled: "Manufacturing Method and Structure of Electrodes For Lithium Based Electrochemical Devices", describes high power electrodes, and my prior art application Ser. No. 10/119,220, entitled: "Method of Automated Hybrid Lithium-Ion Cells Production and Method of the Cell Assembly and Construction", describes high energy density lithium-ion cells. These cells are "hybrid" in the sense that they combine the advantages of lithium-ion polymer cells, and lithium-ion cells with liquid electrolyte. The same construction and method of assembly may apply to high power cells, having thinner electrodes and full width collector tabs.

My U.S. Pat. No. 5,811,959 describes an interface device and charger for efficient and safe charging, and discharging of multi-celled batteries, or packs of batteries, and which device is preferably external to the battery.

In the present invention, the combination of the high power and high energy density rechargeable cells provides a rechargeable battery, that delivers high maximum electrical current over time with the high power cells being recharged by the high energy density cells, preferably in parallel, and all cells can be recharged through an interface device by a charger than can recharge both types of cells, and preferably in parallel. This arrangement provides a rechargeable battery that meets both high power and high-energy electrical requirements.

SUMMARY OF THE INVENTION

It has now been found that a hybrid rechargeable battery, which has high power and high energy density lithium cells can be obtained, and which preferably has an external interface circuit device for protecting and safe recharging and discharging of the battery.

This battery consists preferably of a combination of high power prismatic rechargeable cells and high energy density prismatic rechargeable cells. The high power cells may include lithium-ion type thin electrodes, with full width tabs, and current collectors embedded in the middle, having the shortest possible electronic path, and an ultra-thin microporous separator laminated to the electrodes for minimum resistance. Improved nano-particle materials may preferably be used in the electrodes of the high power cells.

These high power cells deliver maximum electrical current for a longer time than any capacitor, and are continuously and individually recharged, preferably in parallel for maximum efficiency, preferably by high energy density lithium cells preferably of the same or similar construction, but with thicker electrodes.

Both types of cells are individually and simultaneously rechargeable, preferably with a low volt parallel charger for maximum efficiency and safety, through a smart circuit interface. This same interface also protects all the individual cells from over discharge when discharged in series at high voltage. This interface is preferably part of the appliance, not part of the battery, which reduces the cost of battery replacement.

The high power and high-energy cells may be preferably packaged in one case, or separately in two cases connected by cables. Other types of cells, like rolled cylindrical, or rolled flat "prismatic" cells, or any type of cells with lithium metal anodes are also useable in this system.

The principal object of the invention is to provide a hybrid rechargeable battery which has both high power and high energy density.

A further object of the invention is to provide a battery of the character aforesaid wherein the hybrid rechargeable battery is provided with an external device for safe and efficient recharging and discharging.

A further object of the invention is to provide a battery of the character aforesaid wherein the battery combines high power cells and high energy density cells.

A further object of the invention is to provide a battery of the character aforesaid which repeatedly delivers maximum electrical current for a longer time than any capacitor.

A further object of the invention is to provide a battery of the character aforesaid where the high power cells are recharged by the high-energy cells, and both types of cells are rechargeable by an outside charger.

A further object of the invention is to provide a battery of the character aforesaid which is simple and inexpensive to construct, due to its prismatic welded cells construction.

A further object of the invention is to provide a battery of the character aforesaid which is durable and long lasting in service.

A further object of the invention is to provide a battery of the character aforesaid which is particularly suitable for mass production.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

DESCRIPTION OF THE PREFERRED EMBODIMENTS

When referring to the preferred embodiments, certain terminology will be utilized for the sake of clarity. Use of such terminology is intended to encompass not only the described embodiments, but also technical equivalents, which operate and function in substantially the same way to bring about the same result.

Figure 1:
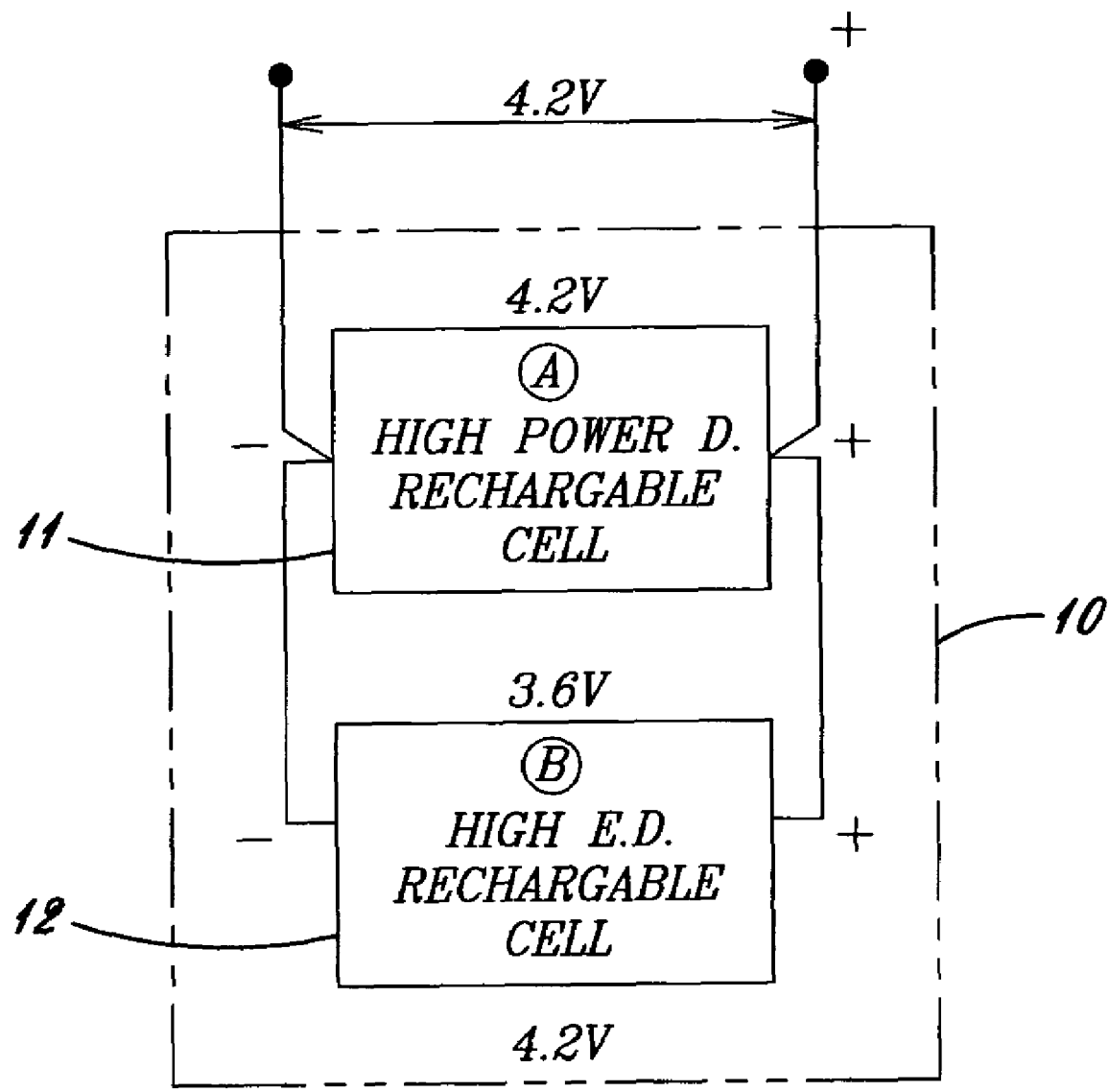
FIG. 1 is a schematic view of a hybrid parallel cell pack or battery constructed in accordance with the invention.

Referring now to the drawings and FIG. 1 thereof, a high power and high energy density hybrid cell pack 10 is therein illustrated, and which is one embodiment of the invention The cell pack or battery 10 includes a lithium-ion rechargeable high power density cell 11 and a lithium-ion rechargeable high energy density cell 12. The cells 11 and 12 may be of any suitable construction, with the preferred construction being flat prismatic as described in my prior U.S. patent application Ser. No. 10/119,220, and Ser. No. 10/911,036, which are incorporated by reference herein. The difference between the cells is preferably only in the thickness of their electrodes, and/or the active materials particle size.

For example, the cell 11 may include a thin first electrode layer, which may be an anode, (not shown) with a copper metal grid current collector (not shown) embedded in the middle of its active material, with a full width collector terminal tab (not shown) extending therefrom. The active material may be micro MCMB, (6 microns mesocarbon microbeads), or graphite, or lithium nano-titanate ($Li_4Ti_5O_{12}$). The current collector (not shown) may be precoated with a carbon and a polymeric binder on both sides, and baked. A first microporous separator (not shown) is in contact with the anode layer.

A second thin electrode layer (not shown) is provided on top of the first thin separator (not shown) which layer may be a first cathode, and which has a solid aluminum metal grid current collector (not shown) embedded therein. The active material may be lithium nano-cobaltate, or lithium-nano-manganate, or mixed lithium-nano-oxides, such as $LiNiCoO_2$ or $LiMnNiCoO_2$ etc., and their mixtures. The current collector (not shown) has a full width collector terminal tab (not shown) extending therefrom.

A second microporous, thin separator (not shown) is provided, identical or similar to the first separator, in contact with the bottom of the anode.

A third thin electrode layer (not shown) is provided, in contact with the second separator, which electrode is a second cathode, and identical to the first cathode layer. The third layer also has a solid aluminum metal grid current collector (not shown) embedded therein, which is of porous aluminum, with a full width collector terminal tab (not shown) extending therefrom. The terminal tabs of the cathodes may be on the opposite end of the call 11 from the terminal tab of the anode.

The current collectors may have a precoated carbon and a polymeric binder on both sides. The active materials of the cell 11 may preferably be of nano-particles, and the separators of 0.5 mil thick porous Teflon.

The cell 11 may preferably also be assembled as described in my prior U.S. patent application Ser. No. 10/119,220, by heat and pressure, with the various layers bonded together. The described construction and materials permit the up to 50 C discharge rate of the high power density cells, which results in 4000 W/kg power density (P.D.), or more, similar to an ultracapacitor (P.D.), but having much higher energy storage capacity (=longer pulse) than any capacitor. The cell 11 is preferably activated by 1M LiPF6/EC/DMC/EMC (1:1:1 ratio) electrolyte, and sealed in a moisture proof enclosure.

The high energy density cell 12 should be constructed in the same manner and of the same materials as described for the cell 11, except that its electrodes should be substantially thicker, preferably by at least 100% than the electrodes used in the cell 11, and may or may not use nano-particles. This construction permits achieving up to 240 Wh/Kg energy density (E,D,).

The cells 11 and 12 may also be of rolled cylindrical, or rolled flat prismatic configuration, if desired. Other types of cells using different chemistry are also usable, so long as they have compatible voltages, by an electrochemical potential, or by a build-up in series. For example, high capacity reversible, modified cathode materials, such as $LiFeS_2$, LiS, $FeS_2$, or Sulphur, can be used, which can increase E.D. of the high E.D. cells up to 400 Wh/kg.

Figure 2:
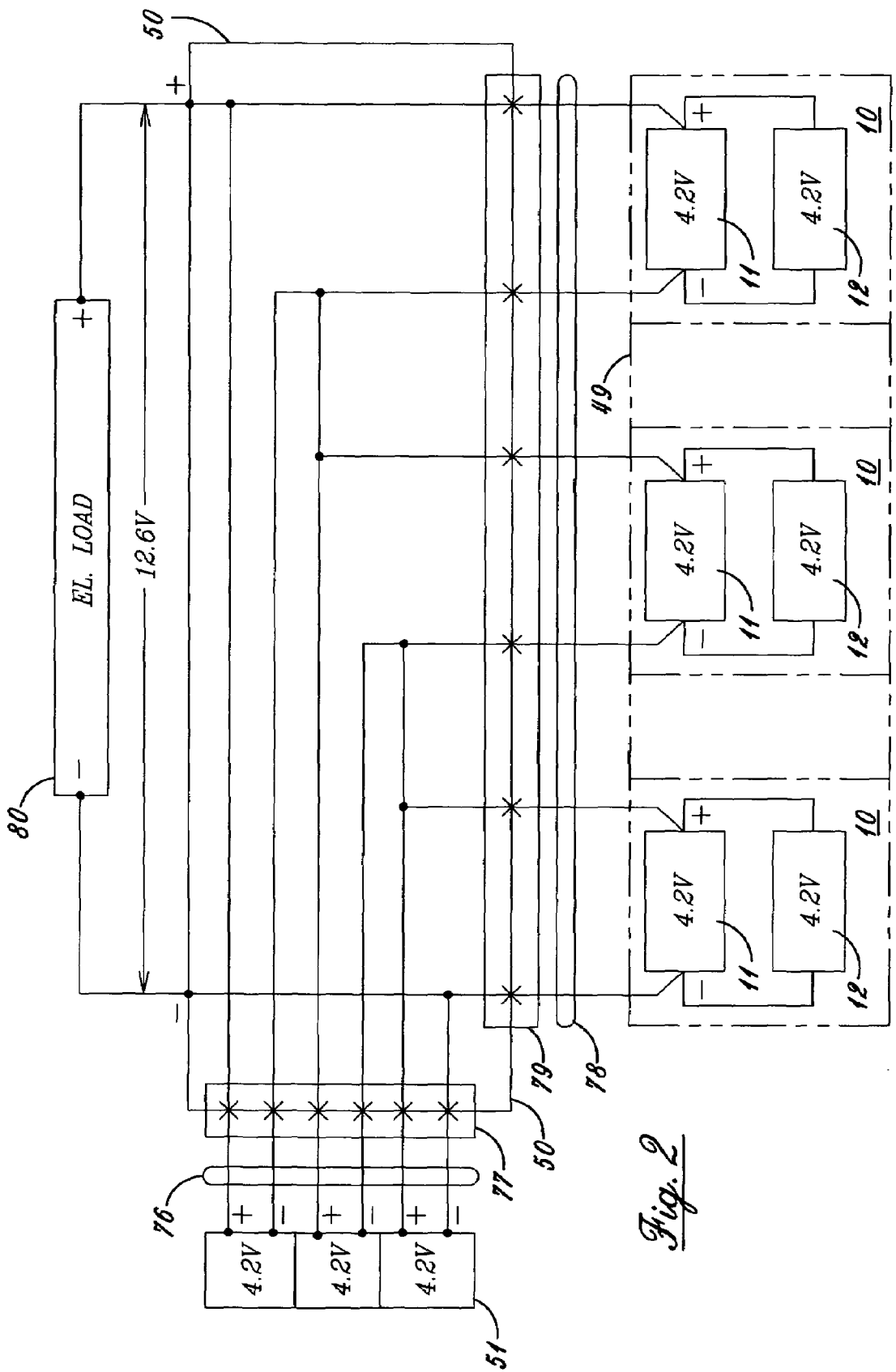
FIG. 2 is a schematic view of a multi-celled hybrid battery in accordance with the invention with a charger charging the cells in parallel.
Figure 4:
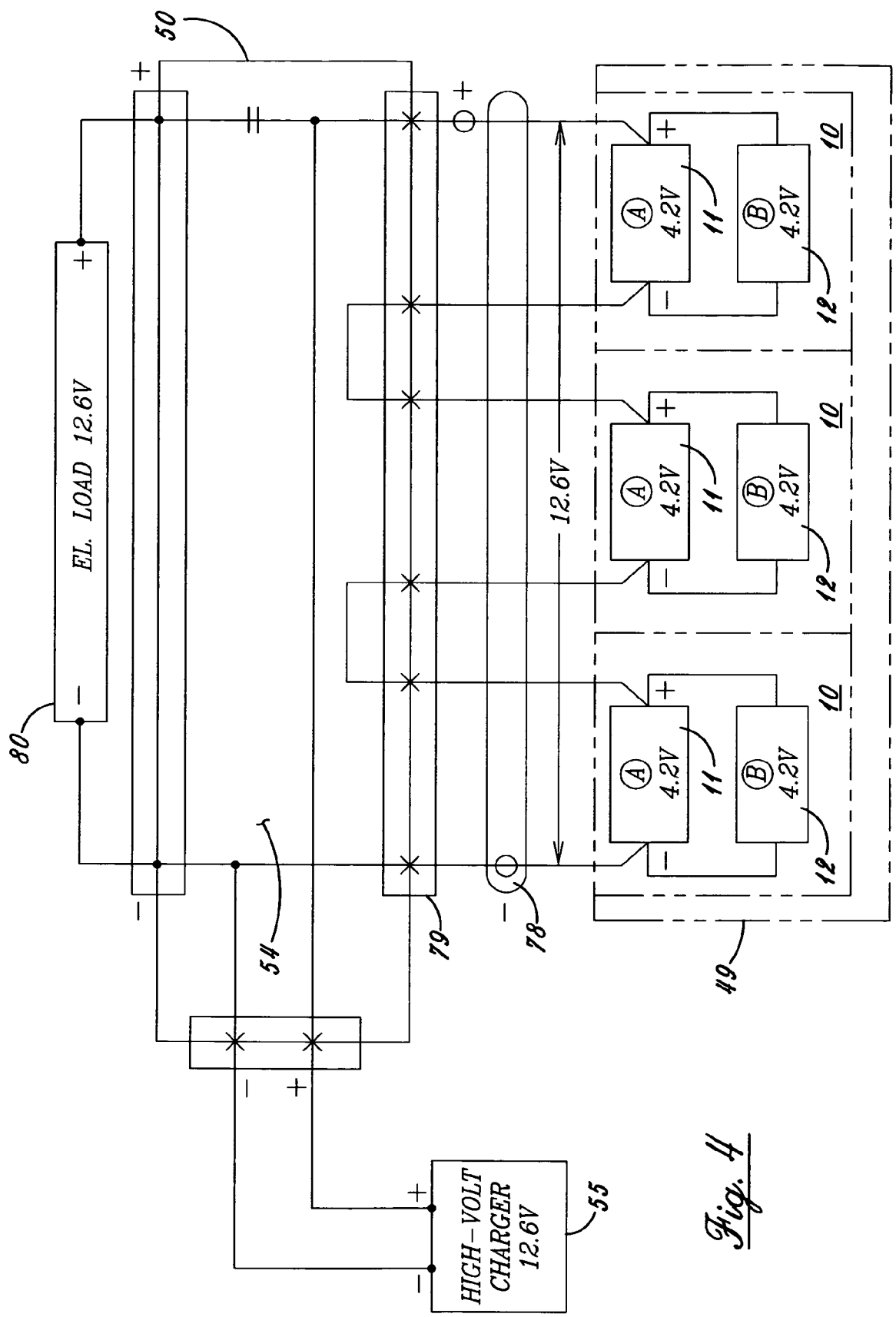
FIG. 4 is a schematic view of a multi-celled hybrid in accordance with the invention, with the hybrid rechargeable cell packs being charged in series. Like numerals refer to like parts throughout the several views and Figures. It should, of course, be understood that the description and drawings herein are merely illustrative, and that various combinations, modifications and changes can be made in the structures disclosed without departing from the spirit of the invention.

For limited cycling applications, such as retrievable sonobuoys, the anodes of all cells may be of lithium metal, or lithium-metal based alloy foil. This provides higher energy density and low self discharge. Lithium metal anodes result in higher capacity of the high power rechargeable cells at 50 C rate of discharge, than the other described anodes, and also result in up to 270 Wh/kg energy density of the high energy rechargeable cells. The cells 11 and 12 when they are of the same voltage may be packaged in one enclosure sharing the same electrolyte, or in two enclosures, but always with parallel connections, as shown in FIGS. 1, 2 & 4, resulting in hybrid parallel cell packs 10, with the cells 12 continuously recharging the cells 11. Several cells 12 in a parallel pack can also be recharging in parallel several cells 11 in a parallel pack, to achieve a higher capacity (not shown).

Referring to FIG. 2, which is another embodiment of the invention, a multi-celled hybrid battery 49, with an interface circuit device 50, and a charger 51 is therein illustrated, and preferably the device and the charger are as described in my prior U.S. Pat. No. 5,811,959, which is incorporated herein by reference.

The multiple charger 51 charges the cells 11 and 12 in packs 10, through the interface device 50 as shown in FIG. 2, via cable 76, and plug 77 in parallel, and the packs 10 are discharged through the device 50, in series, while the cell packs 10 are individually sensed, and individually disconnected by the protective circuitry of the device 50. The device 50 is preferably part of the appliance 80 powered by the hybrid battery, and not part of the battery. The battery 49 may be disconnectable by the plug 79 with cable 78. All cell packs 10 are monitored for voltage by the device 50, and when any cell pack reaches the maximum or minimum volt limit, that corresponding hybrid cell pack 10 is disconnected from charging, or discharging. In case of discharging in series, any disconnected cell pack will also disconnect all cell packs.

Figure 3:
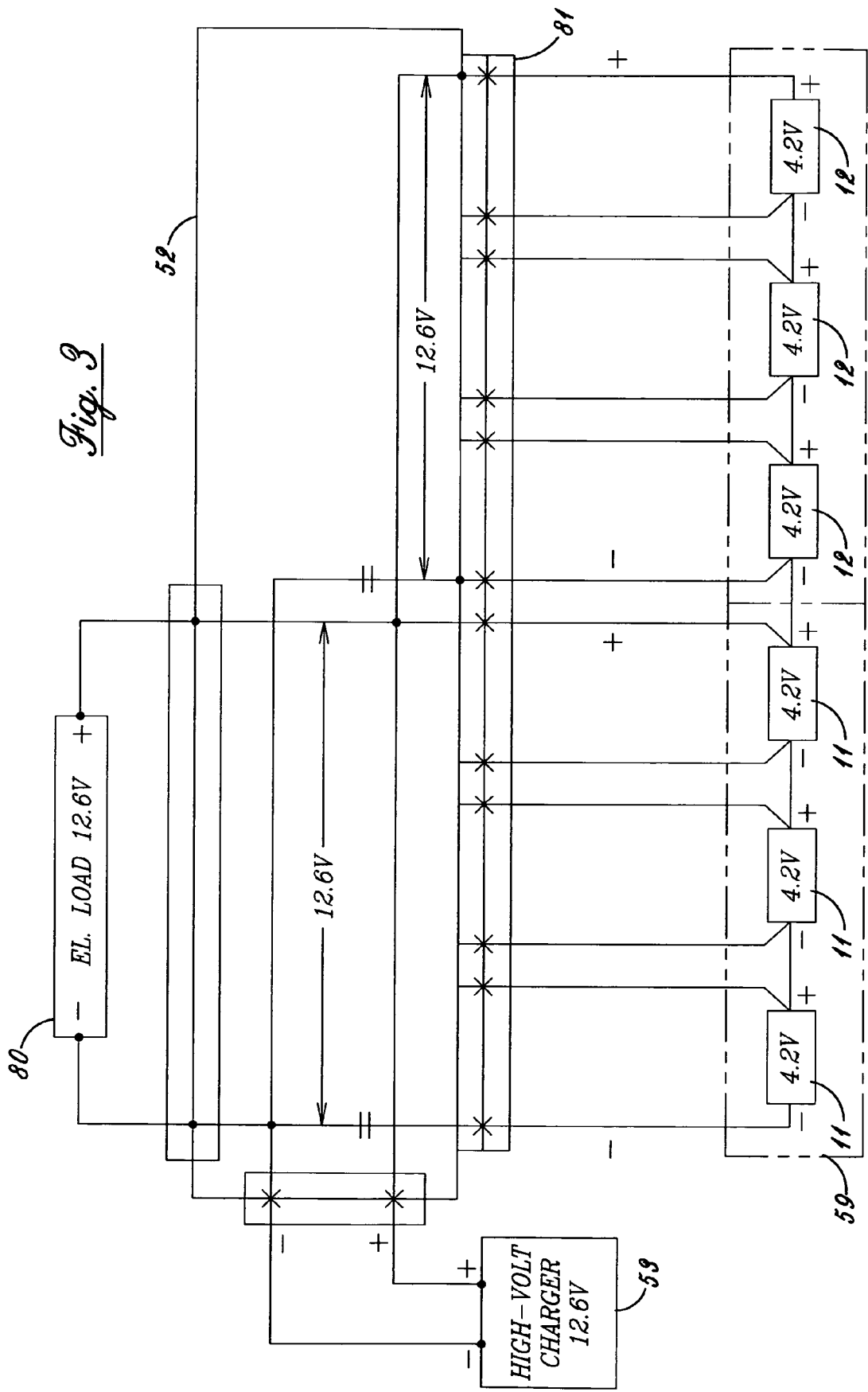
FIG. 3 is a schematic view of a multi-celled hybrid battery in accordance with the invention, with a charger charging the cells in series.

Referring to FIG. 3, which is another embodiment of the invention, a multicelled hybrid battery 59 is illustrated, with an interface device 52, and a plurality of cells 11, and a plurality of cells 12, connected in two groups, in series for charging, and in series for discharging. All cells are monitored for voltage, by the device 52, and when any cell reaches the maximum or minimum volt limit, the device 52 will automatically disconnect and stop charging by charger 53, or discharging of all high power cells, or all high energy density cells, depending upon in which series group the cell is.

Referring now to FIG. 4, which is another embodiment of the invention, a multicelled hybrid battery 49 with an interface device 54, and a charger 55 is illustrated. The hybrid battery has a plurality of hybrid parallel cell packs 10 connected in series, for charging and discharging in series, through the device 54. All hybrid cell packs are monitored for voltage by the device 54, and when any hybrid cell pack reaches the maximum or minimum volt limit, the device 54 will automatically disconnect from charging or discharging all hybrid cell packs 10. If desired, the high power cells can also be physically tied into one group (high power density battery), and the high energy density cells can be tied into another group (high energy density battery), but electrically they should be connected as shown schematically in FIGS. 1-4, by a disconnectable cable(s), or wires. Similarly the devices 52 and 54 are preferably not part of the battery, and may be disconnectable by the plugs 79 and 81. It should be apparent to any person skilled in the art, that various combinations of the cells described can be made in the battery, such as lithium-ion cells with the lithium cells having lithium-metal anodes, or with other chemistry rechargeable cells of both types, whereby the invention is not limited to the described cells. The voltages of the cells and batteries shown in FIGS. 1-4 are shown only as examples, and may be of any desired voltage, by selecting the appropriate electrochemistry potential, and the amount of cells, or hybrid cell packs in series. It will thus be seen that structures have been provided with which the objects of the invention are achieved.

I claim:

1. A multi-cell hybrid rechargeable battery which comprises:

at least two high power lithium-ion cells connected into a series string said cells each having an anode electrode layer, a metal current collector in contact with said anode electrode layer, with a collector terminal extending therefrom, at least one microporous separator in contact with said anode electrode layer, at least one cathode electrode layer in contact with said at least one separator, a metal current collector in contact with said cathode electrode layer, and a collector terminal extending from said cathode current collector, and at least two high energy density lithium-ion cells connected into a separate series string, said cells having an anode electrode layer, a metal current collector in contact with said anode electrode layer, with a collector terminal extending therefrom, at least one microporous separator in contact with said anode electrode layer, at least one cathode electrode layer in contact with said at least one separator, a metal current collector in contact with said cathode layer having a collector terminal extending therefrom, said electrodes of said lithium-ion high energy density cells are substantially thicker than the electrodes of said high power density lithium-ion cells, wherein said high power cells string is discharged in series, and is continuously recharged in series by said high energy density cell string.

2. A multi-cell hybrid rechargeable battery as defined in claim 1, wherein;

at least one of said lithium-ion cells is replaced with a rechargeable lithium cell having a lithium metal based anode.

3. A multi-cell hybrid rechargeable battery as defined in claim 1, or 2, which has a charger connectable to said series cell strings of said battery, and wherein;

said high power cell strings are electrically connected to said charger, and all cells are charged in series, and all cells are individually monitored for voltage by said interface circuitry, and said high power series string is disconnected from charging when any cell of this string is charged to a predetermined limit, and in which said high power series cell string and said high energy density series string are electrically connected and discharged in parallel through said interface circuitry, and each series string is individually disconnected from discharging by said interface circuitry, when any of its cells is discharged to a predetermined limit.

4. A multi-cell hybrid rechargeable battery which comprises:

at least one high power density lithium-ion cell, said cell having an anode electrode layer, a metal current collector in contact with said anode electrode layer, with a collector terminal extending therefrom, at least one microporous separator in contact with said anode electrode layer, at least one cathode electrode layer in contact with said at least one separator, a metal current collector in contact with said cathode electrode layer, and a collector terminal extending from said cathode current collector, at least one high energy density lithium-ion cell, said cell having an anode electrode layer, a metal current collector in contact with said anode electrode layer, with a collector terminal extending therefrom, at least one microporous separator in contact with said anode electrode layer, at least one cathode electrode layer in contact with said at least one separator, a metal current collector in contact with said cathode layer having a collector terminal extending therefrom, said electrodes of said lithium-ion high energy density cell are substantially thicker than the electrodes of said high power density lithium-ion cell, wherein said high energy density cell is connected in parallel to said high power density lithium-ion cell, whereby said high power density cell is discharged, and is continuously recharged in parallel by said high energy density lithium-ion cell.

5. A multi-cell hybrid rechargeable battery which comprises:
at least two hybrid rechargeable lithium-ion batteries as defined in claim 4, connected in series, wherein said high power density cells are discharged in series, and are continuously and individually recharged in parallel by said high energy density cells.

6. A multicell hybrid rechargeable battery as defined in claim 4 in which:
said electrodes of said lithium-ion high energy density cell are at least 100% thicker than the electrodes of said high power densitylithium-ion cell.

7. A multi-cell hybrid rechargeable battery as defined in claim 5 wherein at least one of said lithium-ion cells is replaced with a rechargeable lithium cell having a lithium metal based anode.

8. A multi-cell hybrid rechargeable battery as defined in claim 6 wherein at least one of said lithium-ion cells is replaced with a rechargeable lithium cell having a lithium metal based anode.

9. A multi-cellhybrid rechargeable battery as defined in claims 4, or 5, or 6, or 7, or 8, in which the cathode materials of said high power density cells are selected from the group comprising $LiMn_2O_4$, $LiCoO_2$, $LiNiCoO_2$, $LiMnNiCoO_2$, and their mixtures.

10. A (multi-cell) hybrid rechargeable battery as defined in claims 4, or 5, or 6, or 7, or 8, in which the cathode materials of said high energy density cells are selected from the group comprising $LiMn_2O_4$, $LiCoO_2$, $LiNiCoO_2$, $LiFeS_2$, $LiS$, $FeS_2$, $S$ and their mixtures.

11. A (multi-cell) hybrid rechargeable battery as defined in claims 4, or 5, or 6, or 7, or 8, in which the electrodes of said high power cells have active materials of nanoparticles.

12. A (multicell) hybrid rechargeable battery as defined in claims 4, or 5, or 6, or 7, or 8, in which the anode materials of said cells are selected from the group comprising lithium metal, lithium metal alloy, graphite, micro MCMBs. and $Li_4Ti_5O_{12}$.

13. A multi-cell hybrid rechargeable battery as defined in claims 4, 5, or 6, wherein at least one of said lithium-ion cells is replaced with a rechargeable lithium cell having a lithium metal based anode.

14. A multi-cell hybrid rechargeable battery as defined in claims 4, or 5, or 6, or 7, or 8 which has
a charger connectable to said cells of said battery, and which charger charges said high power cells, and said high energy density cells in series, and in which, said battery is electrically connected to an interface circuitry between said battery and an electrical load, and wherein;
all said high power cells are electrically connected to said charger in series, and all cells are charged in series and individually monitored for voltage by said interface circuitry, and all said cells are disconnected from charging when any cell is charged to a predetermined limit,
and in which said high power cells and said high energy density cells are connected and discharged in series through said interface circuitry, and are individually monitored for voltage, and all said cells are disconnected from discharging by said interface circuitry, when any cell is discharged to a predetermined limit.

15. A multicell hybrid rechargeable battery as defined in claim 14, wherein said interface circuitry is disconnectable from said battery.

16. A multi-cell hybrid rechargeable battery as defined in claims 4, or 5, or 6, or 7, or 8, or 15 which has a low volt multiple parallel charger connectable to said cells of said battery and,
in which said battery is electrically connected to an interface circuitry between said battery and an electrical load, and wherein all cells are electrically connected in parallel to said charger, and said cells are charged in parallel, and are disconnected from charging by said interface circuitry when charged to predetermined limits, and in which said high power cells are electrically connected together and discharged in series through said interface circuitry, and all cells are disconnected from discharging by said interface circuitry when any cell is discharged to a predetermined limit.

17. A multi-cell hybrid rechargeable battery as defined in claims 4, or 5, or 6, or 7, which has at least one of said cells of prismatic construction, with collector terminal tabs of full width.

18. A multi-cell hybrid rechargeable battery as defined in claim 16, wherein said interface circuitry is disconnectable from said battery.

19. A multi-cell hybrid rechargeable battery as defined in claim 3, wherein said interface circuitry is disconnectable from said battery.

* * * * *